US012455232B2

(12) United States Patent
Donnat et al.

(10) Patent No.: US 12,455,232 B2
(45) Date of Patent: Oct. 28, 2025

(54) DRONE FOR MEASURING DATA REPRESENTATIVE OF AMOUNTS OF AT LEAST TWO GASES PRESENT IN THE ATMOSPHERE AWAY FROM THE GROUND AND ASSOCIATED METHOD

(71) Applicants: Centre national de la recherche scientifique, Paris (FR); UNIVERSITE DE REIMS CHAMPAGNE-ARDENNE, Reims (FR); TotalEnergies OneTech, Courbevoie (FR)

(72) Inventors: Ludovic Donnat, La Motte Servolex (FR); Abel Maunoury, Lyons (FR); Lilian Joly, Les Grandes Loges (FR); Thomas Decarpenterie, Reims (FR); Jérémie Burgalat, Reims (FR); Nicolas Chauvin, Mourmelon le Grand (FR); Grégory Albora, Tours-sur-Marne (FR); Nicolas Dumelie, Betheny (FR); Julien Cousin, Betheny (FR)

(73) Assignees: Centre national de la recherche scientifique, Paris (FR); UNIVERSITE DE REIMS CHAMPAGNE-ARDENNE, Reims (FR); TotalEnergies Onetech, Courbevoie (FR)

( * ) Notice: Subject to any disclaimer, the term of this patent is extended or adjusted under 35 U.S.C. 154(b) by 305 days.

(21) Appl. No.: 17/914,953

(22) PCT Filed: Mar. 25, 2021

(86) PCT No.: PCT/EP2021/057765
§ 371 (c)(1),
(2) Date: Sep. 27, 2022

(87) PCT Pub. No.: WO2021/191360
PCT Pub. Date: Sep. 30, 2021

(65) Prior Publication Data
US 2023/0146441 A1 May 11, 2023

(30) Foreign Application Priority Data
Mar. 27, 2020 (FR) .................................... 20 03027

(51) Int. Cl.
*G01N 21/3504* (2014.01)
*B64U 101/35* (2023.01)
(Continued)

(52) U.S. Cl.
CPC ..... *G01N 21/3504* (2013.01); *B64U 2101/35* (2023.01); *G01N 2021/3133* (2013.01);
(Continued)

(58) Field of Classification Search
CPC .......... B64U 2101/35; G01N 21/3504; G01N 21/85; G01N 2021/3133; G01N 2021/8578
See application file for complete search history.

(56) References Cited

U.S. PATENT DOCUMENTS 2,869,858 A * 1/1959 Hartwell ................. F16F 1/362
267/147
3,780,566 A † 12/1973 Smith
(Continued)

FOREIGN PATENT DOCUMENTS

EP 2948761 † 12/2015
EP 3100022 A1 12/2016
(Continued)

OTHER PUBLICATIONS

Coburn, S., et al. "Continuous regional trace gas source attribution using a field-deployed dual frequency comb spectrometer" 18 pages (2017).
(Continued)

*Primary Examiner* — Justin N Olamit (74) *Attorney, Agent, or Firm* — Troutman Pepper Locke LLP (57) ABSTRACT

This drone comprises a sensor for measuring representative data, comprising at least one measurement cell that is open to the atmosphere, at least a first laser source configured to inject, into the measurement cell, a first laser beam at a first wavelength characteristic of a first gas to be detected and a second laser source configured to inject, into the measurement cell, a second laser beam at a second wavelength characteristic of a second gas to be detected. The measuring sensor comprises a detector common to the two laser sources, said detector being configured to detect a first measurement signal originating from the measurement cell and resulting from injection of the first laser beam into the measurement cell and a second measurement signal originating from the measurement cell and resulting from injection of the second laser beam into the measurement cell.

21 Claims, 6 Drawing Sheets

(51) Int. Cl.
  *G01N 21/31* (2006.01)
  *G01N 21/85* (2006.01)
(52) U.S. Cl.
  CPC ............... *G01N 2021/8578* (2013.01); *G01N 2201/0214* (2013.01)

(56) References Cited

U.S. PATENT DOCUMENTS

| | | | |
|---|---|---|---|
| 5,703,365 A * | 12/1997 | Ishihara | G01J 3/433 |
| | | | 250/339.13 |
| 6,509,566 B1 † | 1/2003 | Wamsley | |
| 8,294,899 B2 | 10/2012 | Wong | |
| 9,671,332 B2 * | 6/2017 | Christensen | G01N 21/3504 |
| 10,203,311 B2 | 2/2019 | Risk et al. | |
| 10,209,188 B2 * | 2/2019 | Ng | G08G 5/0069 |
| 10,704,891 B2 | 7/2020 | Choudhury et al. | |
| 10,753,864 B2 | 8/2020 | Kasten et al. | |
| 10,816,458 B2 | 10/2020 | Kasten et al. | |
| 11,079,366 B2 | 8/2021 | Klein et al. | |
| 11,299,268 B2 * | 4/2022 | Christensen | G01P 5/02 |
| 11,656,125 B2 * | 5/2023 | Bounaix | G01J 3/433 |
| | | | 356/437 |
| 2002/0005955 A1 † | 1/2002 | Kramer | |
| 2010/0140478 A1 * | 6/2010 | Wilson | G01N 21/3504 |
| | | | 250/339.13 |
| 2013/0044314 A1 † | 2/2013 | Koulikov | |
| 2018/0188129 A1 | 7/2018 | Choudhury et al. | |
| 2019/0025199 A1 † | 1/2019 | Koulikov | |
| 2019/0301931 A1 | 10/2019 | Ng et al. | |
| 2019/0357771 A1 * | 11/2019 | Yu | A61N 5/0613 |
| 2021/0055180 A1 | 2/2021 | Thorpe et al. | |
| 2021/0109074 A1 | 4/2021 | Smith et al. | |
| 2021/0140934 A1 | 5/2021 | Smith et al. | |
| 2021/0190745 A1 * | 6/2021 | Buckingham | G01M 3/16 |
| 2021/0255158 A1 | 8/2021 | Smith et al. | |
| 2021/0364427 A1 † | 11/2021 | Smith | |
| 2021/0380272 A1 | 12/2021 | Parrott et al. | |
| 2021/0382475 A1 * | 12/2021 | Smith | G01N 33/0016 |
| 2023/0107797 A1 * | 4/2023 | Frish | G01N 21/39 |
| | | | 73/31.05 |

FOREIGN PATENT DOCUMENTS

| | | | | |
|---|---|---|---|---|
| WO | WO-2016047168 A1 * | 3/2016 | ......... | G01N 21/3504 |
| WO | WO-2019090755 A1 * | 5/2019 | ........... | B64C 27/001 |
| WO | 2019246280 † | 12/2019 | | |
| WO | 2020/206006 A1 | 10/2020 | | |
| WO | 2021/026215 A1 | 2/2021 | | |
| WO | 2021/055902 A1 | 3/2021 | | |
| WO | 2021158916 † | 8/2021 | | |
| WO | 2022/016107 A1 | 1/2022 | | |

OTHER PUBLICATIONS

Cossel, K. C., et al. "Open-path dual-comb spectroscopy to an airborne retroreflector" Optica 4(7):724-728 (2017).
Joly, L. et al. "Atmospheric Measurements by Ultra-Light SpEctrometer (AMULSE) Dedicated to Vertical Profile in Situ Measurements of Carbon Dioxide (CO2) Under Weather Balloons Instrumental Development and Field Application" Sensors 16(1609):1-14 (2016).
Joly, L., et al. "The evolution of AMULSE (Atmospheric Measurements by Ultra-Light Spectrometer) and its interest in atmospheric applications. Results of the Atmospheric Profiles of GreenhousE gasEs (APOGEE) weather balloon release campaign for satellite retrieval validation" Atmospheric Measurement Techniques 1-28 (2019).
Khan, A., et al. "Low Power Greenhouse Gas Sensors for Unmanned Aerial Vehicles" Remote Sensing 4:1355-1368 (2012).
Zhang, W., et al. "Ada[tive cavity-enhanced dual-comb spectroscopy" Photonics Research 7(5):883-889 (2019).
International Search Report issued in International Patent Application No. PCT/EP2021/057765 dated Jun. 11, 2021, with English translation.
Lilian Joly, The evolution of AMULSE (Atmospheric Measurements by Ultra-Light Spectrometer) and its interest in atmospheric applications. Results of the Atmospheric Profiles of GreenhousE gasEs (APOGEE) weather balloon release campaign for satellite retrieval validation, p. 1-28, Sep. 25, 2019, Atmospheric Measurement Techniques Discussion.†

\* cited by examiner
† cited by third party

DRONE FOR MEASURING DATA REPRESENTATIVE OF AMOUNTS OF AT LEAST TWO GASES PRESENT IN THE ATMOSPHERE AWAY FROM THE GROUND AND ASSOCIATED METHOD

CROSS REFERENCE TO RELATED APPLICATIONS

The present application is a U.S. National Phase Application under 35 U.S.C. § 371 of International Patent Application No. PCT/EP2021/057765 filed Mar. 25, 2021, which claims priority of French Patent Application No. 20 03027 filed Mar. 27, 2020. The entire contents of which are hereby incorporated by reference.

FIELD OF THE INVENTION

The present invention relates to a drone for measuring data representative of amounts of at least two gases present in the atmosphere away from the ground, comprising:
 a chassis;
 at least one propelling device able to allow the chassis to move through the atmosphere, away from the ground;
 at least one sensor for measuring the representative data, said at least one sensor being borne by the chassis;
 a control system for controlling the sensor for measuring the representative data, said control system being borne by the chassis.

BACKGROUND

The gases to be measured are especially greenhouse gases such as methane or carbon dioxide.

Preoccupations regarding protection of the environment have contributed to reinforcement of legislation on polluting emissions, especially in Europe.

Thus, industrial units, such as those present in the petroleum or chemical industry, must adapt to increasingly demanding environmental constraints.

In particular, greenhouse gases are emitted during operations of extracting, transporting, refining and storing hydrocarbons. These emissions are tracked by operators and are regularly subject to reduction measures.

It is in particular necessary to characterize the sources of these greenhouse gases and the amounts of greenhouse gases emitted by these sources, with a view to ensuring that they are controlled and to reporting progress made.

However, the techniques used to identify sources of greenhouse gases and quantify diffuse and short-lived emissions are still not entirely satisfactory.

Specifically, these emissions are very difficult to measure, because they are often unchanneled, and potentially located close to basins or lakes or inaccessible places, for example at height or at the centre of the unit in question.

To obtain enough measurements, it is therefore necessary to make a high number of gas-measurement passes over the installation.

To do so, it is known to use aeroplanes that fly at low altitude and that are equipped with sensors for measuring greenhouse gases. These aeroplanes make many back-and-fourth trips facing the installation with a view to taking the measurement.

However, such aeroplanes have the major disadvantage of also emitting greenhouse gases. Their operating cost is also very high and restrictions may exist on flying over certain installations with aeroplanes.

To mitigate this problem, it is possible to use drones, even though drones are not entirely satisfactory in the context of these measurements.

Specifically, existing drones have by nature a fairly limited range. Furthermore, their payload is low, this limiting the number of pieces of equipment located on-board, in particular with a view to carrying out multiple measurements.

SUMMARY

One aim of the invention is therefore to provide a measuring drone that has a sufficient range to perform campaigns of detection of gases the emissions of which are diffuse and short-lived, while having a measurement capacity sufficient to perform the desired analyses.

To this end, one subject of the invention is a drone such as mentioned above, characterized in that the sensor for measuring the representative data is able to measure data representative of amounts of at least two gases present in the atmosphere, the sensor for measuring the representative data comprising at least one measurement cell that is open to the atmosphere, and, for the or for each measurement cell, at least a first laser source able to inject, into the measurement cell, a first laser beam at a first wavelength characteristic of a first gas to be detected and a second laser source able to inject, into the measurement cell, a second laser beam at a second wavelength characteristic of a second gas to be detected, the sensor for measuring the representative data comprising a detector common to the two laser sources, said detector being able to detect a first measurement signal originating from the measurement cell and resulting from injection of the first laser beam into the measurement cell and a second measurement signal originating from the measurement cell and resulting from injection of the second laser beam into the measurement cell.

The drone according to the invention may comprise one or more of the following features, alone or in any technically possible combination:
 the control system is able to implement sequential and successive injections of the first laser beam into the measurement cell, then of the second laser beam into the measurement cell, without injection of the second laser beam into the measurement cell, when the first laser beam is injected into the measurement cell, and without injection of the first laser beam into the measurement cell, when the second laser beam is injected into the measurement cell, respectively;
 the control system is able to selectively and sequentially activate the first laser source and the second laser source to implement the sequential and successive injections;
 the measurement cell comprises two mirrors located facing and away from each other and defining therebetween a measurement cavity, and two holders bearing the two mirrors, respectively, the laser sources and the detector being joined to be holders, away from the measurement cavity;
 the first laser source and the second laser source are able to inject, into the measurement cavity, a laser beam of width larger than 1 mm, and especially comprised between 3 mm and 6 mm;
 at least one element among the first laser source, the second laser source and the detector is equipped with a metal heat-exchange plate that is swept by an airflow generated by the propelling device when the propelling device is activated;

the control system comprises a casing and at least one heat exchanger comprising at least one metal heat-exchange plate, and preferably a series of metal plates, the or each metal heat-exchange plate protruding from the casing and being swept by an airflow generated by the propelling device when the propelling device is activated;

it comprises a temperature-measuring sensor and pressure-measuring sensor placed in the measuring cell;

it comprises an altitude-measuring sensor borne by the chassis;

the chassis comprises a plurality of members forming an apertured framework, a first region of the chassis holding the control system, and a second region of the chassis, which second region is located away from the first region of the chassis, holding the measurement cell, the members advantageously being made of polymer, and especially of polyetheretherketone;

it comprises dampers mounted between the chassis and the measurement cell, the dampers especially being formed from spring wire;

it comprises a system for transmitting data, said system being borne by the chassis, the representative data detected by the detector being able to be transmitted by the transmitting system;

it comprises a memory for storing representative data collected by the detector, and an on-board computing unit located in the chassis and able to process the representative data collected by the detector at any given time, with a view to computing amounts of at least two gases at various times, the data-transmitting system being able to transmit the amount values computed by the computing unit;

it has a total mass lower than 10 kg, and especially lower than 8 kg;

the measurement cavity is configured to reflect multiple times the laser beams injected by the first source and by the second source;

the laser component of each of the first laser source and of the second laser source consists of a laser diode;

the measurement cell is configured to operate through direct absorption of laser light in the measurement cavity, on contact with the gases the amount of which is to be measured.

Another subject of the invention is a method for measuring data representative of amounts of at least two gases present in the atmosphere away from the ground, comprising:

flying a drone such as defined above through the atmosphere away from the ground;

injecting, using the first laser source, into the measurement cell, a first laser beam at a first wavelength representative of a first gas;

detecting, using the detector common to the two laser sources, a first measurement signal originating from the measurement cell and resulting from the first laser beam injected into the measurement cell;

injecting, using the second laser source, into the measurement cell, a second laser beam at a second wavelength representative of a second gas to be detected;

detecting, using the detector common to the two laser sources, a second signal measured in the measurement cell and resulting from the second laser beam injected into the measurement cell.

The measuring method according to the invention may comprise the following feature:

the control system implements sequential and successive injections of the first laser beam into the measurement cell, then of the second laser beam into the measurement cell, without injection of the second laser beam into the measurement cell, when the first laser beam is injected into the measurement cell, and without injection of the first laser beam into the measurement cell, when the second laser beam is injected into the measurement cell, respectively.

BRIEF DESCRIPTION OF THE DRAWINGS

The invention will be better understood on reading the following description, which is given merely by way of example, with reference to the appended drawings, in which.

DETAILED DESCRIPTION

Figure 1:
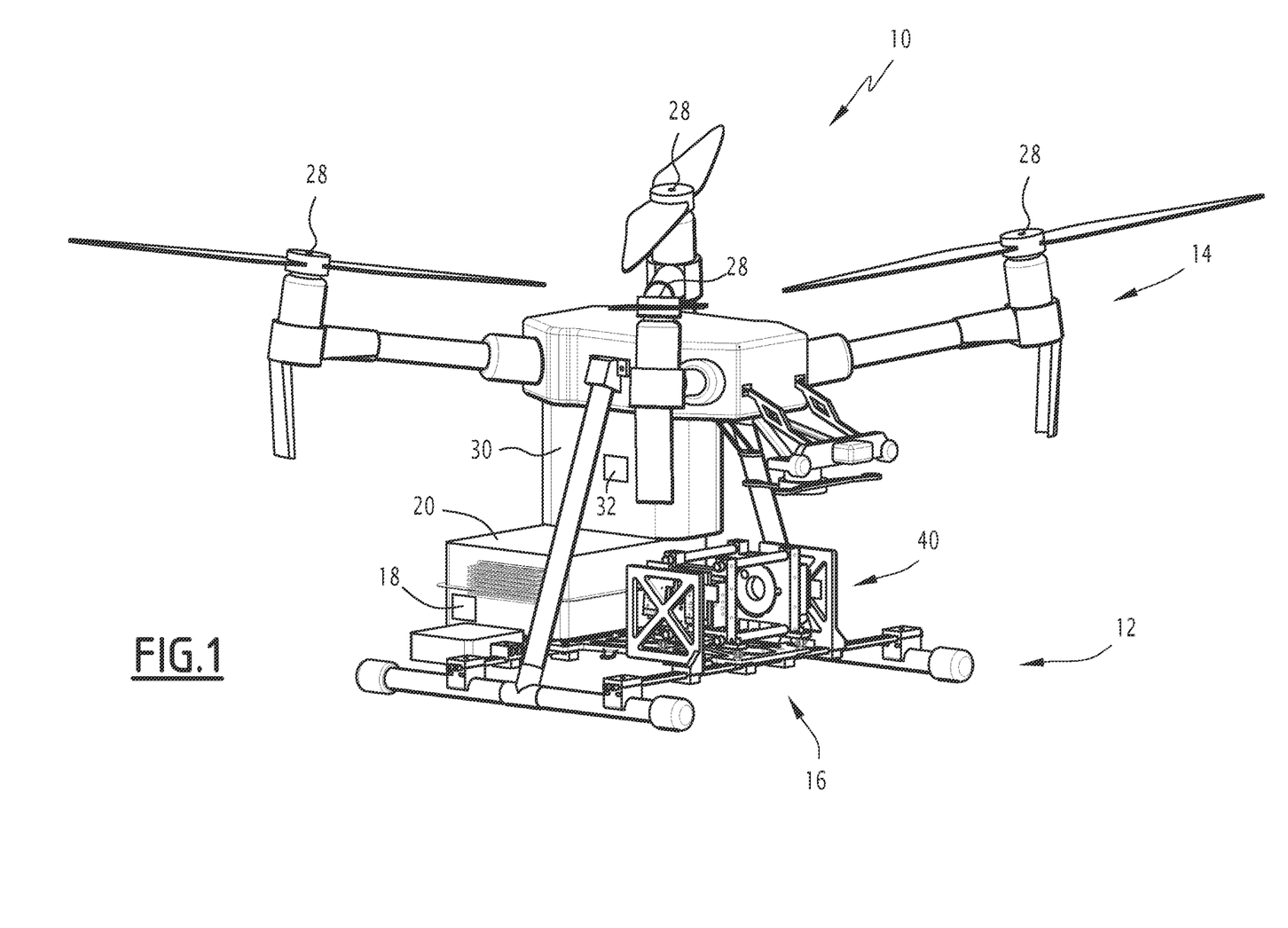
FIG. 1 is a perspective view of a first drone according to the invention.
Figure 2:
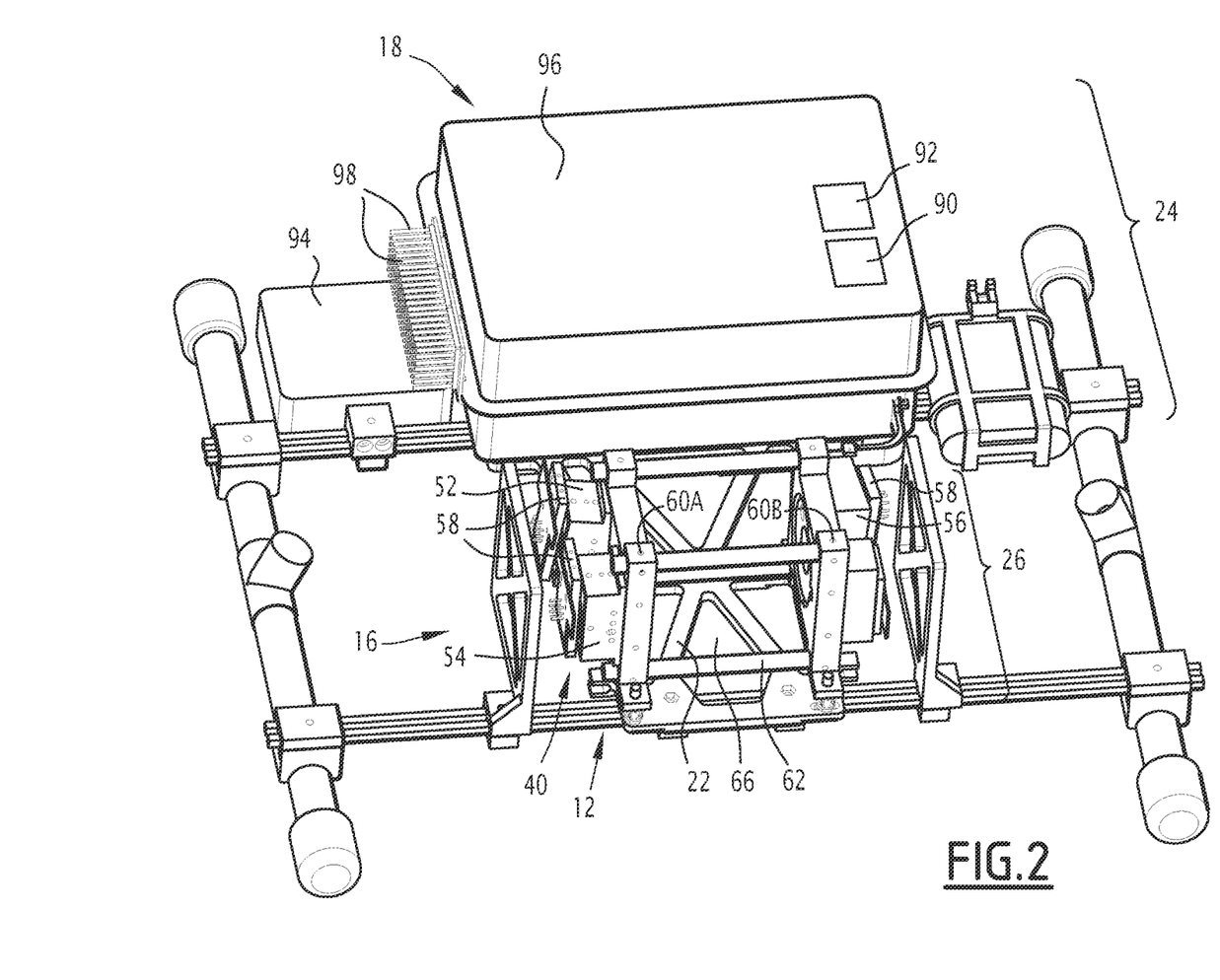
FIG. 2 is a view from above of the chassis of the drone bearing a measuring sensor and a control system for controlling the measuring sensor.
Figure 3:
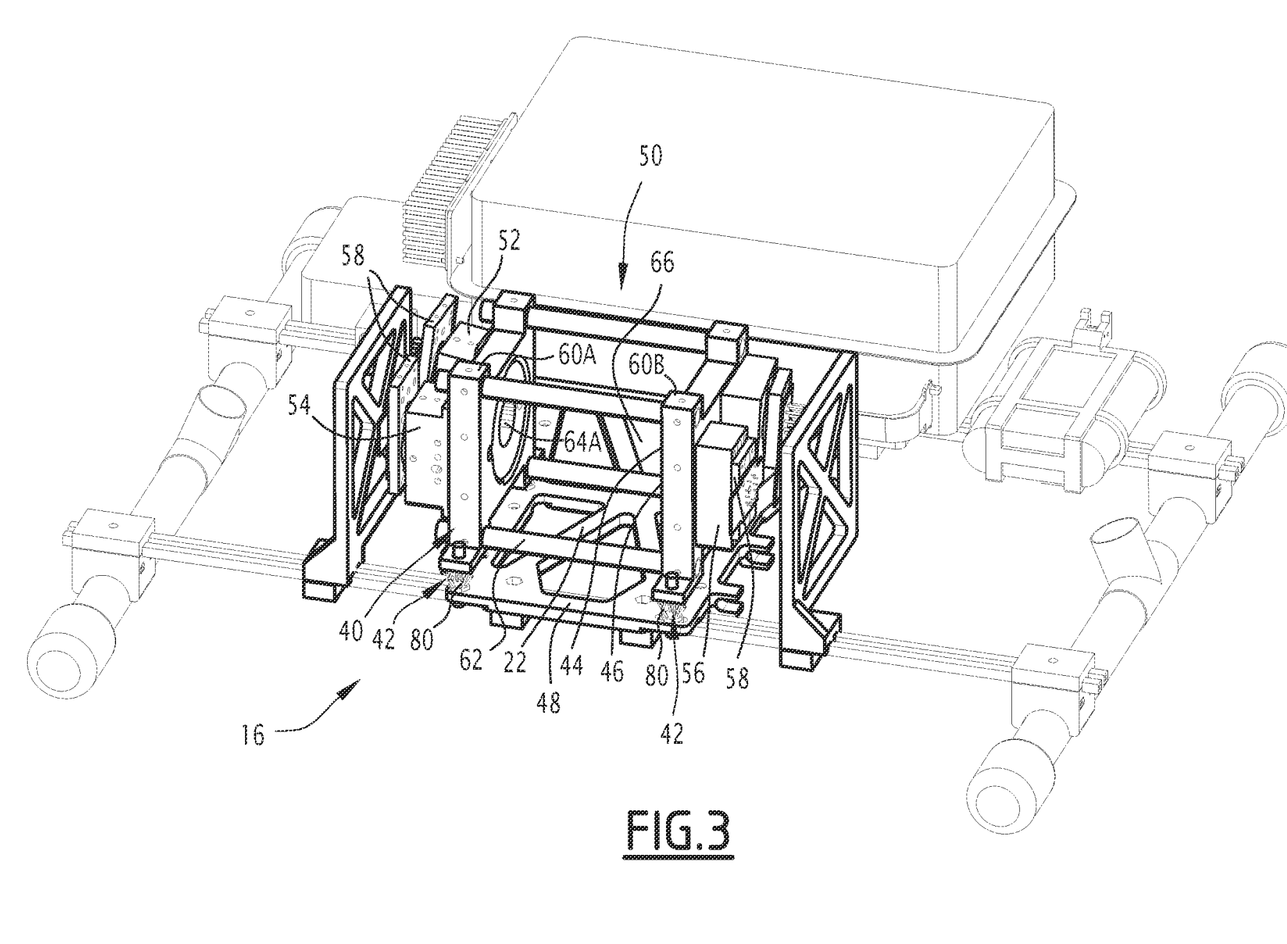
FIG. 3 is a front view of the measuring sensor illustrated in FIG. 2.

A first drone 10 according to the invention is illustrated in FIGS. 1 to 3. The drone 10 is especially able to measure representative data in order to be able to compute the amounts of at least two gases present in the atmosphere through which the drone 10 is moving.

The representative data are for example measured facing an industrial installation, such as a petroleum-related installation, in particular an installation for extracting, transporting, refining, processing or storing hydrocarbons.

The gases the amount of which is measured are preferably methane and carbon dioxide.

In variants, other gases are measurable, such as aromatic gases (especially benzene or even butadiene), ethane, or carbon monoxide. More generally, the measured amount is that of a set of volatile organic compounds (or VOCs) with a view to determining a footprint of these compounds.

A gas is measurable provided that it possesses a defined spectral signature, for example in the infrared (especially for wavelengths comprised between 700 nm and 2 µm) or in the ultraviolet (especially for wavelengths between 10 nm and 380 nm).

The drone 10 is able to move through the atmosphere above and around the installation with a view to taking, at various points in the atmosphere above and around the installation, measurements of data representative of the amounts of at least two gases.

As illustrated in FIG. 1, the drone 10 comprises a chassis 12, and a propelling assembly 14, which is able to allow the chassis 12 to take off away from the ground and it to move by flying through the atmosphere above the ground.

The drone 10 further comprises a measuring assembly 16, a control system 18 for controlling the measuring assembly 16, and, advantageously, a transmitting system 20.

The chassis 12 is here formed of an apertured framework, formed from members 22. In the example shown in FIG. 2, the framework is of rectangular shape. It has members 22 along the sides of a rectangle, and members 22 along the diagonals of the rectangle.

The members 22 are for example made of polymer, in order to decrease the weight of the drone 10.

The selected polymer is preferably a polymer taking solid form.

The polymer is for example selected from polyetheretherketone, poly(acrylonitrile butadiene styrene), poly(lactic acid), and poly(acrylonitrile styrene acrylate).

As illustrated in FIG. 2, the members 22 of the framework define a first region 24 for holding the control system 18, and a second region 26 for holding the measuring assembly 16, the latter region being laterally offset with respect to the first region 24.

With reference to FIG. 1, the propelling assembly 14 comprises a plurality of propelling devices 28, which here are propellers driven to rotate by a motor.

The propelling assembly 14 further comprises a power source 30, here formed by a battery, and a system 32 for locating and for controlling the movement of the drone 10 through the atmosphere.

In this example, the drone 10 is a multi-rotor rotary-wing drone. It does not have any fixed wings, its lift being generated by the propelling assembly 14.

The drone 10 is for example a rotary-wing quadcopter drone, and especially a DJI M200 as sold by DJI.

The propelling assembly 14 here comprises a plurality of propellers that rotate about substantially vertical axes. By "substantially vertical", what is generally meant is that the axes of rotation of the propellers are inclined by less than 30° with respect to the vertical.

When the motors of the propellers are supplied with electrical power by the battery, the propellers are driven to rotate about their axis, generating a downward airflow, which is able to sweep in part the chassis 12 in the first region 24 and in the second region 26.

The locating and controlling system 32 comprises a position sensor, especially a GPS and/or an inertial measurement unit. It further comprises a controlling unit, which is able to control the movement of the drone 10 along a path recorded before the flight and loaded into the system 32, or remotely and manually via a remote control.

The drone 10 is thus able to automatically follow a predefined path, or, alternatively, to be controlled manually by an operator.

The measuring assembly 16 comprises a sensor 40 for measuring the data representative of the amounts of at least two gases, which is mounted on the chassis 12 advantageously via dampers 42. It further comprises temperature- and pressure-measuring sensors 44, 46 and, advantageously, an altitude sensor 48.

With reference to FIGS. 2 to 5, the sensor 40 for measuring the representative data comprises a measurement cell 50 that is open to the atmosphere, a first laser source 52, which is able to detect a first gas, a second laser source 54, which is intended to detect a second gas, and a common detector 56 that is intended to receive signals allowing the first gas and second gas to be detected, the signals being generated by the first source 52 and by the second source 54, respectively.

The sensor 40 further comprises heat-exchange plates 58 mounted on each source 52, 54 and on the detector 56, respectively.

The measurement cell 50 is here a single cell for measuring in the same volume data representative of the amounts of first gas and of second gas.

The measurement cell 50 comprises two facing holders 60A, 60B, and linking bars 62 that join the holders 60A, 60B. The measurement cell 50 further comprises facing mirrors 64A, 64B, which are borne by the holders 60A, 60B, respectively, the mirrors 64A, 64B defining therebetween a measurement cavity 66.

In this example, the holders 60A, 60B are mounted parallel to each other, perpendicular to a longitudinal axis A-A' of the measurement cavity 66. The axis A-A' is preferably horizontal when the drone 10 is resting on a planar horizontal holder.

The holders 60A, 60B here have a prismatic shape and a polygonal, and preferably square, exterior outline.

The linking bars 62 set the distance between the holders 60A, 60B. In this example, the linking bars 62 extend between the vertices of the polygon defining the outline of the holders 60A, 60B. Said linking bars extend parallel to one another, thereby defining intermediate passing spaces.

The measurement cavity 66 is therefore open in at least one direction, and preferably in at least two directions, between the facing holders 60A, 60B and between the linking bars 62.

The length of the measurement cavity 66, measured between the holders 60A, 60B, is for example smaller than 50 cm and especially comprised between 5 cm and 30 cm.

The length of the measurement cavity 66 is tailored to the range of quantities expected for the gas to be measured. For example, the measurement cavity 66 is longer if the gas is in trace amounts and/or if the response that it possesses at the measured wavelength is weak.

In contrast, the measurement cavity 66 is shorter if the gas to be measured is present in a relatively large amount or if its response at the measured wavelength is strong.

The mirrors 64A, 64B are each mounted on one holder 60A, 60B, respectively, with a view to being placed facing each other. The mirrors 64A, 64B are concave, with their concavities facing each other.

A first holder 60A and a first mirror 64A comprise at least two holes 68, 70 in order to allow a first beam originating from the first laser source 52 and a second beam originating from the second laser source 54 to be injected, respectively.

The second mirror 64B facing the first mirror 64A, and the second holder 60B comprise a signal-extraction hole 72, in order to allow the detector to receive a signal from the measurement cavity 66.

The first laser source 52 and the second laser source 54 are mounted on one side of the first holder 60A, outside the measurement cavity 66, on either side of the longitudinal axis A-A' of the cavity.

Each source 52, 54 comprises a laser component 74 and a temperature-controlling element 76, a thermoelectric element for example.

The laser component 74 of the first source 52 is for example able to emit a first laser beam centred on a first wavelength $\lambda 1$. The laser component 74 of the second source 54 is able to emit a second laser beam centred on a second wavelength $\lambda 2$ different from the wavelength $\lambda 1$.

The wavelengths $\lambda 1$, $\lambda 2$ are preferably separated, advantageously by at least 5 nm, and especially by at least 100 nm.

For example, to detect methane, the first source 52 is able to emit a first laser beam centred on a wavelength $\lambda 1$ comprised between 3230 nm and 3250 nm, and especially between 3238 nm and 3242 nm. To detect carbon dioxide, the second source 54 is for example able to emit a second laser beam centred on a wavelength $\lambda 2$ comprised between 1990 nm and 2020 nm, and especially between 2000 nm and 2005 nm.

More generally, the wavelength associated with a target module is selected depending on the spectral signature of each target module molecule and of any interfering molecules. The wavelength chosen depends on the measurement environment (pressure, temperature, concentration of target and interfering molecules, etc.).

The temperature-controlling element 76 is able to stabilize the temperature of the sources 52, 54.

In the example shown in the figures, the heat-exchange plates 58 are mounted behind the first laser source 52, the second laser source 54 and the detector 56, in thermal contact with the temperature-controlling elements 76.

The heat-exchange plates 58 are made of metal, of aluminium for example. They protrude with respect to the sources 52, 54, with a view to being swept by the airflow generated by the propelling devices 28 during the rotation of the propellers.

Thus, the heat transferred by the temperature-controlling element 76 is removed using the heat-exchange plates 58, without it being necessary to install an additional fan for controlling the temperature of the sources 52, 54 or of the detector 56. This decreases the weight of the drone 10.

The detector 56 is common to the first laser source 52 and to the second laser source 54. It is able to detect the intensity of a signal extracted from the measurement cavity 66 at wavelengths including the wavelength $\lambda 1$ of the beam emitted by the first laser source 52 and the wavelength $\lambda 2$ of the beam emitted by the second laser source 54.

Thus, the measured intensity may be related to the incident intensity using the Beer-Lambert law, which is:

$$I=I_0 \exp(L \cdot N \cdot K)$$

where I is the measured intensity, $I_0$ is the incident intensity, L is the length of the optical path travelled through the measurement cell 50, N is the number of molecules of the studied gas on the path and K is the absorption coefficient of this gas.

Use of a detector 56 common to the two laser sources 52, 54 decreases the number of components present in the measuring sensor 40, this substantially decreasing the weight of the sensor 40 and allowing other sensors and/or instruments to be incorporated into the drone 10, or its mass to be decreased.

The common detector 56 comprises a single detecting device that is sensitive both to the wavelength $\lambda 1$ of the beam emitted by the first laser source 52 and to the wavelength $\lambda 2$ of the beam emitted by the second laser source 54.

The common detector 56 is formed of a single component, for example one sold by Judson (http://www.teledynejudson.com/), Vigo (https://vigo.com.pl/en/products-vigo/) or Hamamatsu (https://www.hamamatsu.com).

The sensor 40 for measuring the representative data advantageously employs a single detector 56 to measure the intensities resulting from the signal output by the measurement cavity 56 for each of the laser sources 52, 54.

The dampers 42, when they are present, comprise spring wires 80 connecting the chassis 12 to each of the holders 60A, 60B. These spring wires 80 are able to partially absorb the vibrations of the propelling assembly 14 and of the movement of the drone 10 through the air.

The temperature-measuring sensor 44 is placed between the facing holders 60A, 60B. The sensor 44 is for example a thermistor, or a thermocouple, able to measure an electrical resistance of a metal element that varies as a function of temperature.

The pressure-measuring sensor 46 for example comprises a pressure-measuring tube that opens into the measurement cavity 66.

The presence of a temperature-measuring sensor 44 and of a pressure-measuring sensor 46 directly within the measurement cell 50, and preferably in the measurement cavity 66, increases the reliability of the collected data, in particular on account of the low concentration of the gases to be measured in the measurement cavity 66.

The altitude sensor 48, when it is present, comprises an altimeter, which is for example equipped with a laser pointing towards the ground so as to measure the height at which the drone 10 is located.

The control system 18 comprises a unit 90 for supplying electrical power to each of these sources 52, 54 selectively, a unit 92 for collecting data measured by the detector 56 and at least one heat exchanger 94, which is able to remove the heat generated by the units 90, 92 without specific fan-assistance. These units are housed in a casing 96.

The unit 90 for supplying electrical power is able to selectively and successively supply power to the first laser source 52 and to the second laser source 54 with a view to obtaining a first phase of illumination of the measurement cavity 66 exclusively by the first laser source 52, without illumination by another laser source such as the second laser source 54, then a second phase of illumination of the measurement cavity 66 exclusively by the second laser source 54, without illumination by another laser source, and in particular by the first laser source 52.

Thus, successive phases of measurement of data representative of the first amount of a first gas, and of the second amount of a second gas, may be carried out in the same measurement cavity 66 of the measurement cell 50, these data being selectively collected by the same detector 56, without interference between the obtained signals.

Figure 6:
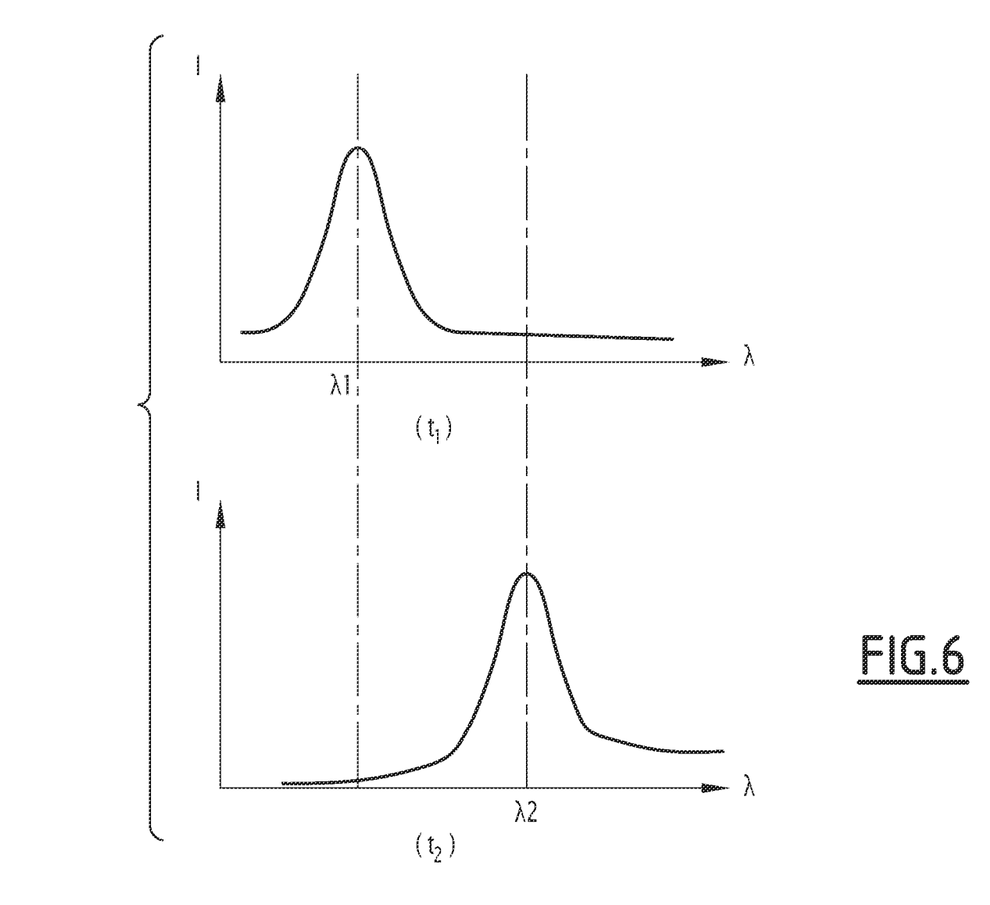
FIG. 6 is a view of the signal detected by the detector, successively during injection of the first beam, then during injection of the second beam.

These representative data form spectra of light intensity as a function of wavelength, such spectra being schematically shown in FIG. 6.

The unit 90 for supplying electrical power is for example connected to the power source 30 of the propelling device 28, or possesses its own power source.

The data-collecting unit 92 comprises at least one memory, able to store the spectra of light intensity as a function of wavelength measured at various times by the detector 56.

The data are for example stored at a frequency higher than 10 Hz, and in particular comprised between 1 Hz and 100 Hz. The stored spectra preferably comprise a number of points higher than 256, and for example are comprised between 256 and 4096 points.

Thus, a very good resolution is obtained as regards determination of the intensity of the peaks measured in the measurement cell 50 as a function of wavelength, this allowing the amounts of the two gases to be deduced therefrom, even if these amounts are very small.

The data-collecting unit 92 is connected to the transmitting system 20 with a view to allowing data to be exported to a receiving station on the ground, during the flight of the drone, at a frequency that may be lower than the acquisition frequency, and for example comprised between 1 Hz and 5 Hz.

The heat exchanger 94 makes thermal contact with each of the power-supplying unit 90 and data-collecting unit 92. It is able to remove the heat produced by these units 90, 92 to plates 98 that protrude out of the casing 96 containing the units 90, 92.

The plates 98 are able to be swept by the airflow generated by the propelling devices 28, with a view to removal of the heat produced by the units 90, 92. Thus, no fan is required in the casing 96 to cool the units 90, 92, this decreasing the weight and electrical power consumption of the drone 10.

The transmitting system 20 comprises a transmitter, able to transmit data to a ground station, these data for example being the data collected by the unit 92 or a fraction of these data.

A method for measuring the amounts of at least two gases present in the atmosphere, preferably facing an industrial installation, will now be described.

Initially, the drone 10 is made to take flight. The propelling devices 28 are activated by the locating and controlling system 32 in order to allow the drone 10 to take off, and it to move towards the zone in which the measurements must be taken.

The propellers of the propelling assembly 14 generate a lifting force. The locating and controlling system 32 controls the movement of the drone 10, either under the effect of manual remote control, or by following an automatic program loaded into the system 32.

During the movement of the drone 10, measurements are taken. To this end, the sensor 40 for measuring representative data, the temperature-measuring sensor 44, the pressure-measuring sensor 46 and optionally the altitude sensor 48 when it is present, are activated.

Measurements are taken by the various sensors 40, 44, 46, 48 during the movement of the drone 10, without having to immobilize the drone 10. To this end, the unit 90 for supplying electrical power selectively and successively supplies power to the first laser source 52, then to the second laser source 54.

Figure 4:
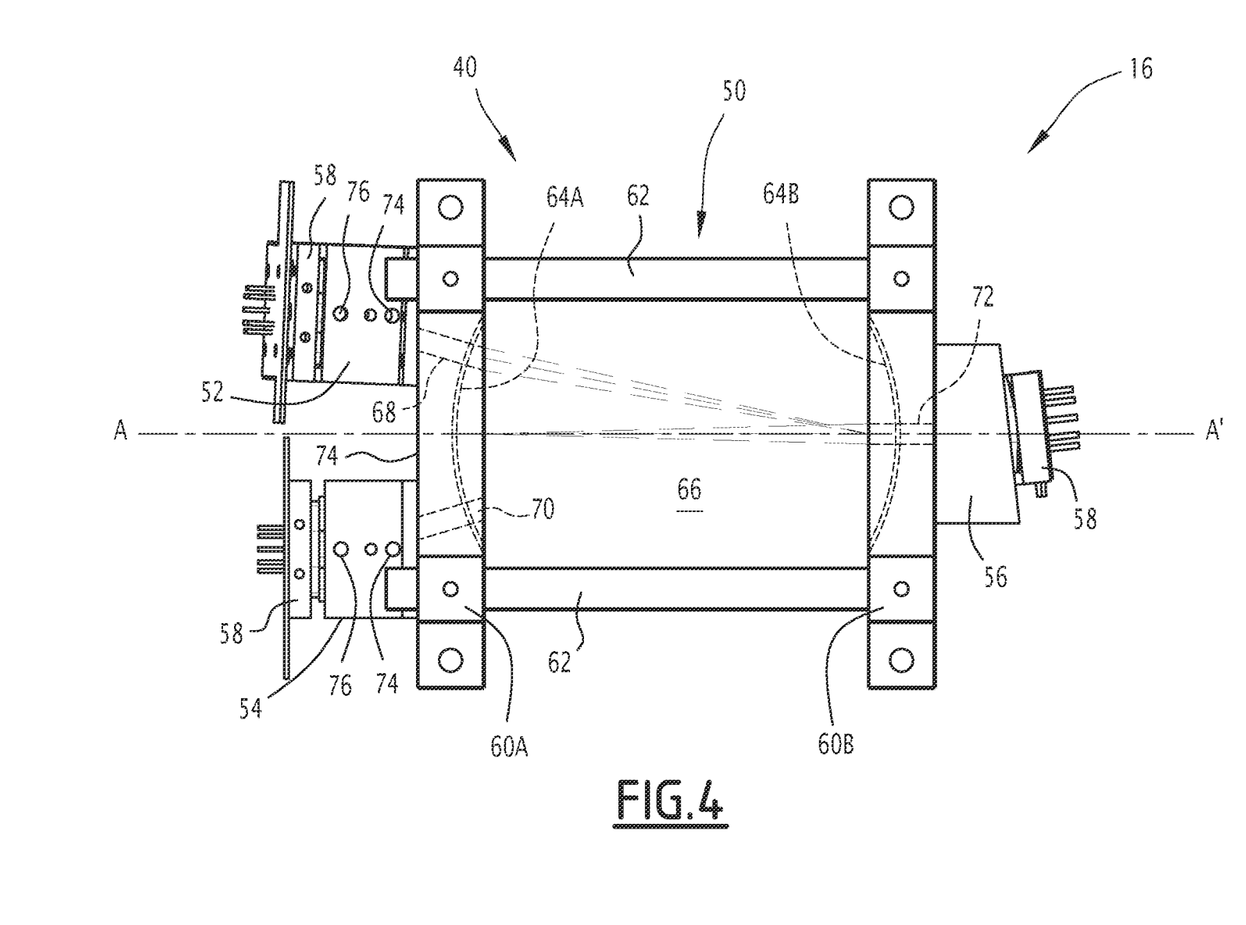
FIG. 4 is a view of the measurement cell, during injection of a first beam.

In each phase of activation of the first laser source 52, the laser component 74 of the second laser source 54 is deactivated. The laser component 74 of the first laser source 52 emits a first laser beam at the wavelength $\lambda 1$, which is injected via the injection hole 68 into the measurement cavity 66.

As indicated above, the thickness of the first laser beam is larger than 1 mm, and especially comprised between 3 mm and 6 mm. This makes it possible to avoid measurement artefacts that might otherwise be created by particles in suspension in the measurement cavity.

In order to increase the length of the optical path L, the first laser beam is successively reflected by the mirrors 64A, 64B and makes back-and-forth trips through the measurement cavity 66.

As illustrated in FIG. 6, by curve (a), a first signal, which results from the first beam emitted by the first source 52, is collected through the sampling hole 72.

This first signal is detected by the detector 56, and the data detected by the detector 56 are sent to the data-collecting unit 92 with a view to being stored.

Figure 5:
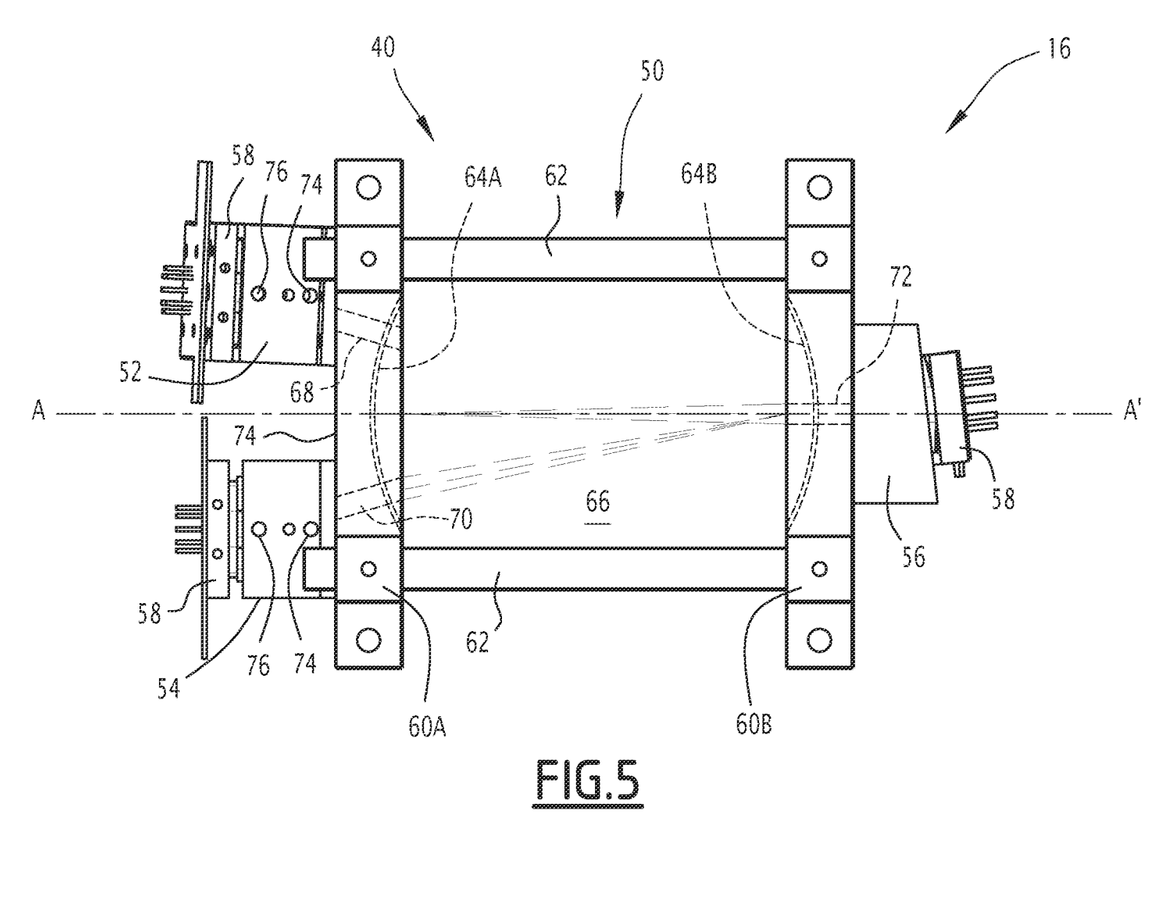
FIG. 5 is a view analogous to FIG. 4, during injection of a second beam.

Next, in each phase of activation of the second laser source 54, the laser component 74 of the first laser source 52 is deactivated. The laser component 74 of the second source 54 emits a second laser beam at the wavelength $\lambda 2$, which is different from the wavelength $\lambda 1$. This laser beam is introduced, via the injection hole 70, into the measurement cavity 66.

As above, the thickness of the second laser beam is larger than 1 mm, and especially comprised between 3 mm and 6 mm.

In order to increase the length of the optical path L, the second laser beam is successively reflected by the mirrors 64A, 64B and makes back-and-forth trips through the measurement cavity 66.

As illustrated in FIG. 6, by curve (b), a second signal, which results from the second beam thus emitted by the second source 54, is collected through the sampling hole 72.

This second signal is detected by the same detector 56 that detected the first signal, and the data detected by the detector 56 are sent to the data-collecting unit 92 with a view to being stored.

Since the measurements are taken successively in the first phase and in the second phase, using the same detector 56, they allow light intensities, at two wavelengths $\lambda 1, \lambda 2$, that are representative of the amount of a first gas and of the amount of a second gas, respectively, to be determined.

When the drone 10 has finished its mission and returns to the ground, the spectra measured by the detector 56 and stored in the memory of the data-collecting unit 92 are transmitted by the transmitting system 20 to a monitoring station.

In the monitoring station, these spectra are stored in association with data on the geographical position of the drone 10 (which data were measured by the locating and controlling system 32), with the temperature and pressure measured by the sensors 44, 46, optionally with the altitude measured by the altitude sensor 48 and with the time at which each measurement was taken.

The drone 10 according to the invention is therefore particularly compact and light. It nevertheless allows precise and reliable data to be obtained, allowing at least two amounts of two gases present in the atmosphere to be deduced, in difficult environments, and for example in the vicinity of industrial installations, by virtue of the presence of a single detector 56 associated with at least two different laser sources 52, 54.

It is thus possible to measure, in the same measurement cell 50, almost simultaneously, data representative of the amounts of each of the two gases, selectively and practically.

In one variant, the drone 10 comprises an on-board computing unit 100 in the chassis 12. The computing unit 100 is able to process the data collected by the detector 56 at any given time, and in particular the light-intensity spectra measured at any given time, with a view to computing amounts of at least two gases at various times, on the basis of the representative data collected by the detector 56 and of a prior calibration.

The data-transmitting system 20 is then able to transmit the amount values computed by the computing unit 100, instead of the spectra of light-intensity data, this decreasing the amount of data to be transmitted in real time and allowing more measurements of amounts of the two gases to be obtained in real time.

In another variant, the drone 10 comprises a plurality of measurement cells 50, of structure analogous to the measurement cell 50 described above, each being dedicated to detection of at least two different gases.

In the example that has just been described, each laser component of the first laser source 52 and second laser source 54 is for example a laser diode. A laser diode is an optoelectronic component that is produced based on semiconductors. It emits coherent monochromatic light.

It is for example formed of a semiconductor junction, which possesses three features: an n-type confinement layer, an active region and a p-type confinement layer. The diode is for example a distributed-feedback laser diode.

As indicated above, the measurement cell 50 employs direct absorption of laser light in the measurement cavity 66, on contact with the gases the amount of which is to be measured. It is therefore a question of a measurement cell 50 for performing direct laser absorption spectroscopy.

The measurement cavity 66 allows the injected laser beams from the first source 52 or from the second source 54 to be reflected multiple times, with a view to increasing the length of the optical path. The measurement cell is thus a multi-pass spectroscopy cell, or Herriott cell.

The invention claimed is:

1. A drone for measuring data representative of amounts of at least two gases present in the atmosphere away from the ground, comprising:
   a chassis;
   at least one propeller configured to allow the chassis to move through the atmosphere, away from the ground;
   at least one representative data measuring sensor the said at least one representative data measuring sensor being borne by the chassis;
   a controller configured to control the at least one representative data measuring sensor to measure the representative data, said controller being borne by the chassis,
   the at least one representative data measuring sensor being configured to measure data representative of amounts of at least two gases present in the atmosphere, the at least one representative data measuring sensor comprising at least one measurement cell that is open to the atmosphere, and, for the at least one measurement cell, at least a first laser source configured to inject, into the at least one measurement cell, a first laser beam at a first wavelength characteristic of a first gas to be detected and a second laser source configured to inject, into the same at least one measurement cell, a second laser beam at a second wavelength characteristic of a second gas to be detected, the at least one representative data measuring sensor comprising a detector common to the first and second laser sources, said common detector being configured to detect a first measurement signal originating from the at least one measurement cell and resulting from injection of the first laser beam into the at least one measurement cell and a second measurement signal originating from the at least one measurement cell and resulting from injection of the second laser beam into the at least one measurement cell, and
   the drone comprising a temperature-measuring sensor and a pressure-measuring sensor placed in the at least one measuring cell.

2. The drone according to claim 1, wherein the controller is configured to implement sequential and successive injections of the first laser beam into the at least one measurement cell, then of the second laser beam into the at least one measurement cell, without injection of the second laser beam into the at least one measurement cell, when the first laser beam is injected into the at least one measurement cell, and without injection of the first laser beam into the at least one measurement cell, when the second laser beam is injected into the at least one measurement cell, respectively.

3. The drone according to claim 2, wherein the controller is configured to selectively and sequentially activate the first laser source and the second laser source to implement the sequential and successive injections.

4. The drone according to claim 1, wherein the at least one measurement cell comprises two mirrors located facing and away from each other and defining therebetween a measurement cavity, and two holders bearing the two mirrors, respectively, the laser sources and the detector being joined to the holders, away from the measurement cavity.

5. The drone according claim 1, wherein the first laser source and the second laser source are configured to inject, into the at least one measurement cavity, a laser beam of width larger than 1 mm.

6. The drone according to claim 5, wherein the width of the laser beam is between 3 mm and 6 mm.

7. The drone according to claim 1, wherein at least one element among the first laser source, the second laser source and the detector is equipped with a metal heat-exchange plate that is swept by an airflow generated by the propeller when the propeller is activated.

8. The drone according to claim 1, wherein the controller comprises a casing and at least one heat exchanger comprising at least one metal heat-exchange plate, the at least one metal heat-exchange plate protruding from the casing and being swept by an airflow generated by the propeller when the propeller is activated.

9. The drone according to claim 1, comprising an altitude-measuring sensor borne by the chassis.

10. The drone according to claim 1, wherein the chassis comprises a plurality of members forming an apertured framework, a first region of the chassis holding the controller, and a second region of the chassis, the second region of the chassis being located away from the first region of the chassis and holding the at least one measurement cell.

11. The drone according to claim 1, comprising dampers mounted between the chassis and the at least one measurement cell.

12. The drone according to claim 1, further comprising a data transmitter, said data transmitter being borne by the chassis, the representative data detected by the detector being configured to be transmitted by the data transmitter.

13. The drone according to claim 12, comprising a memory configured to store representative data collected by the common detector, and an on-board computer located in the chassis and configured to process the representative data collected by the common detector at any given time, to compute amount values of at least two gases at various times, the data transmitter being configured to transmit the amount values computed by the computer.

14. The drone according to claim 1, having a total mass lower than 10 kg.

15. The drone according to claim 1, wherein the common detector comprises a single detector sensitive both to a wavelength of the beam emitted by the first laser and to a wavelength of the beam emitted by the second laser source, the common detector being formed of a single component.

16. The drone according to claim 1, wherein the at least one measurement cell is a direct-laser-absorption-spectroscopy cell.

17. A method for measuring data representative of amounts of at least two gases present in the atmosphere away from the ground, comprising:
   flying a drone according to claim 1 through the atmosphere away from the ground;
   injecting, using the first laser source, into the at least one measurement cell, a first laser beam at a first wavelength representative of a first gas;
   detecting, using the detector common to the two laser sources, a first measurement signal originating from the at least one measurement cell and resulting from the first laser beam injected into the at least one measurement cell;

injecting, using the second laser source, into the at least one measurement cell, a second laser beam at a second wavelength representative of a second gas to be detected; and detecting, using the detector common to the first and second laser sources, a second signal measured in the at least one measurement cell and resulting from the second laser beam injected into the at least one measurement cell.

18. The drone according to claim 1, wherein the measuring cell comprises two mirrors carried by respective supports and defining between them a measuring cavity, the temperature-measuring sensor is disposed between the supports, and the pressure-measuring sensor comprises a pressure measuring tube opening into the measuring cavity.

19. A drone for measuring data representative of amounts of at least two gases present in the atmosphere away from the ground, comprising:

a chassis;

at least one propeller configured to allow the chassis to move through the atmosphere, away from the ground;

at least one representative data measuring sensor, the said at least one representative data measuring sensor being borne by the chassis;

a controller configured to control the at least one representative data measuring sensor to measure the representative data, said controller being borne by the chassis, the at least one representative data measuring sensor being configured to measure data representative of amounts of at least two gases present in the atmosphere, the at least one representative data measuring sensor comprising at least one measurement cell that is open to the atmosphere, and, for the at least one measurement cell, at least one laser source configured to inject, into the at least one measurement cell, at least one laser beam at least one wavelength characteristic of a first gas to be detected and/or characteristic of a second gas to be detected, the at least one representative data measuring sensor comprising at least one detector, the detector(s) being configured to detect at least a measurement signal originating from the at least one measurement cell and resulting from injection of the at least one laser beam into the at least one measurement cell, wherein at least one of:

at least one element among the at least one laser source, and the at least one detector is equipped with a metal heat-exchange plate that is swept by an airflow when the propeller is activated, the airflow being generated in part by the at least one propeller at every instant when the propeller is activated, or the controller comprises a casing and at least one heat exchanger comprising at least one metal heat-exchange plate, the at least one metal heat-exchange plate protruding from the casing and being swept by an airflow when the propeller is activated, the airflow being generated in part by the at least one propeller at every instant when the propeller is activated, and the drone comprising a temperature-measuring sensor and a pressure-measuring sensor placed in the at least one measuring cell.

20. A drone for measuring data representative of amounts of at least two gases present in the atmosphere away from the ground, comprising:

a chassis;

at least one propeller configured to allow the chassis to move through the atmosphere, away from the ground;

at least one representative data measuring sensor, the said at least one representative data measuring sensor being borne by the chassis;

a controller configured to control the at least one representative data measuring sensor to measure the representative data, said controller being borne by the chassis, the at least one representative data measuring sensor being configured to measure data representative of amounts of at least two gases present in the atmosphere, the at least one representative data measuring sensor comprising at least one measurement cell that is open to the atmosphere, and, for the at least one measurement cell, at least one laser source configured to inject, into the at least one measurement cell, at least one laser beam at at least one wavelength characteristic of a first gas to be detected and/or characteristic of a second gas to be detected, the at least one representative data measuring sensor comprising at least one detector, the detector being configured to detect at least a measurement signal originating from the at least one measurement cell and resulting from injection of the at least one laser beam into the at least one measurement cell, the drone comprising dampers mounted between the chassis and the at least one measurement cell, and the drone comprising a temperature-measuring sensor and a pressure-measuring sensor placed in the at least one measuring cell.

21. The drone according to claim 20, wherein the dampers are formed from spring wire.

* * * * *